United States Patent [19]

Etheridge, Jr. et al.

[11] Patent Number: 5,593,490

[45] Date of Patent: Jan. 14, 1997

[54] KAOLIN CLAY SLURRIES HAVING REDUCED VISCOSITIES AND PROCESS FOR THE MANUFACTURE THEREOF

[75] Inventors: Owen E. Etheridge, Jr.; Jorge L. Yordan, both of Sandersville; Robert A. Lowe, Milledgeville, all of Ga.

[73] Assignee: Thiele Kaolin Company, Sandersville, Ga.

[21] Appl. No.: 494,892

[22] Filed: Jun. 26, 1995

[51] Int. Cl.$^6$ .......................... C04B 33/04; C04B 14/10
[52] U.S. Cl. ........................ 106/484; 106/416; 106/486; 241/4; 241/15; 241/24.23
[58] Field of Search ................... 106/416, 484, 106/486, 487; 501/144, 145, 149; 209/659, 155, 3; 241/24, 15, 4

[56] References Cited

U.S. PATENT DOCUMENTS

| | | | |
|---|---|---|---|
| 2,535,647 | 12/1950 | Millman et al. | 106/72 |
| 2,907,666 | 10/1959 | Millman et al. | 501/149 |
| 3,014,836 | 12/1961 | Proctor, Jr. | 106/484 |
| 3,106,476 | 10/1963 | Millman et al. | 106/486 |
| 3,301,691 | 1/1967 | Hemstock et al. | 106/72 |
| 3,326,705 | 6/1967 | Duke | 106/486 |
| 3,464,634 | 9/1969 | Brociner | 106/486 |
| 3,510,330 | 5/1970 | Talvenheimo et al. | 106/484 |
| 3,510,331 | 5/1970 | Talvenheimo et al. | 106/484 |
| 3,817,457 | 6/1974 | Clark | 241/4 |
| 4,030,941 | 6/1977 | Kunkle et al. | 106/309 |
| 4,045,235 | 8/1977 | Bidwell et al. | 106/486 |
| 4,105,466 | 8/1978 | Kunkle et al. | 106/486 |
| 4,118,246 | 10/1978 | Horzepa et al. | 106/484 |
| 4,281,799 | 8/1981 | Oder | 106/486 |
| 4,483,624 | 11/1984 | Bacon, Jr. et al. | 366/293 |
| 5,128,027 | 7/1992 | Halaka et al. | 209/5 |

*Primary Examiner*—Mark L. Bell
*Assistant Examiner*—Michael Marcheschi
*Attorney, Agent, or Firm*—Jones & Askew

[57] ABSTRACT

A kaolin clay slurry having a reduced viscosity is manufactured by a process which comprises the sequential steps of mechanically working an undispersed crude kaolin clay material having a solids content of at least about 65 percent, by weight, under conditions which insure that the kaolin clay material will be subjected to an energy level of at least 10 horsepower-hours per ton of dry kaolin clay material and then subjecting the mechanically worked kaolin clay material to centrifugation to substantially remove any particles having a diameter less than about 0.2 microns.

7 Claims, No Drawings

KAOLIN CLAY SLURRIES HAVING REDUCED VISCOSITIES AND PROCESS FOR THE MANUFACTURE THEREOF

TECHNICAL FIELD

This invention relates to crude kaolin clay materials. In a more specific aspect, this invention relates to kaolin clay materials having improved viscosities. This invention also relates to a process for the manufacture of these slurries.

This invention is useful for the manufacture of kaolin clay slurries from crude kaolin clay materials. By the term "crude", we mean raw or unprocessed (i.e., untreated kaolin clay materials which have been extracted from a mine).

This invention is especially useful to process those crude kaolin clay materials which, due to their inherently high viscosities, either cannot be processed in the conventional manner or if processed conventionally, the product obtained will not be of acceptable viscosity; for example, in paper coating applications.

BACKGROUND OF THE INVENTION

Kaolin is a naturally occurring, relatively white clay which may be generally described as a hydrated aluminum silicate. Kaolin clay is widely used as a filler and pigment in various materials, such as rubber and resins, and in various coatings, such as paints and coatings for paper.

As is well known in the industry, a large portion of the kaolin deposits in Georgia contains clays which are acceptable with regard to color and purity for refining into pigments for paper coatings, but which are too viscous to be processed by conventional kaolin processing methods. With regard to these viscous clays, a common practice is to avoid such clays by selective mining techniques. However, this practice can obviously create waste and environmental problems.

From a general standpoint, the kaolin clays of Georgia can be classified into two types—(1) hard, fine-grained Tertiary kaolin clays and (2) soft, coarse-grained Cretaceous kaolin clays. In some instances, kaolin clays exist which exhibit physico-chemical characteristics of both types.

Cretaceous kaolin clays of Georgia are soft, coarse-grained and contain abundant stacks and books of kaolinite, together with individual platelets of kaolinite. The coarse-grained nature of the Cretaceous kaolin clays is believed due to the recrystallization of kaolinite during weathering and/or diagenesis of the kaolin clay deposit.

Weathering of the sediments which formed the kaolin clays of Georgia has also formed very fine-grained (i.e., less than 0.2 microns) impurities such as smectite and illite. Within the kaolin clay deposits, these impurities may occur as coatings on the stacks, books and platelets of kaolinite. As is well known in the industry, poor theological properties can result when these expandable layer-silicates become concentrated within a kaolin clay.

In the prior art, certain patents deal with improving the viscosity of kaolin slurries by physically removing slimes. In these cases, the objective of removing the "slimes" is to reduce the content of "viscosity increasing" contaminants which, by virtue of their very fine particle size, concentrate preferentially in the ultrafine fractions (slimes) of a crude kaolin clay.

Brociner U.S. Pat. No. 3,464,634 teaches a method for lowering the low shear viscosity using a desliming centrifuge as the means of physically removing expandable layer minerals from kaolin. The invention entails deflocculating a high solids aqueous kaolin suspension with a deflocculant followed by high shear mixing (also pugging or kneading), dilution of the kaolin suspension and desliming in a high-speed centrifuge. Halaka et al. U.S. Pat. No. 5,128,027 teaches a method of removing mineral slimes which is accomplished by over dispersing a kaolin slurry, thereby reflocculating kaolin particles, and then allowing the kaolin flocculates to settle and separate. In the two above-mentioned patents, a prerequisite is that the clay be in a deflocculated state prior to and during the viscosity reducing operations.

Contrary to the prior art, in the present invention the crude kaolin material is mechanically worked (such as in a pug/kneading type mill) while in its natural flocculated state, that is to say in the absence of any deflocculating agent or dispersant. Pugging a crude kaolin in the solids range of 65% to 75%, preferably at least 71–74% solids and without dispersant or deflocculant added, followed by desliming centrifugation, produces clay slurries of lower viscosity than those produced by similarly deslimed clays that have been pugged in a deflocculated state.

Pugging alone has also been shown to improve the viscosity of kaolin slurries. U.S. Pat. Nos. 2,535,647 and 2,907,666 of Millman el. al. teach that mechanically working a high solids kaolin/water mixture can dramatically reduce the low shear viscosity of kaolin slurries. U.S. Pat. No. 2,535,647 states that a deflocculating agent is added during the pugging while U.S. Pat. No. 2,907,666 kneads the clay in the absence of dispersant. Millman et al. U.S. Pat. No. 3,106,476, discloses that high intensity agitation of kaolin slurries in the presence of dispersant is also helpful in improving the low shear viscosity of kaolin clays.

Other patents utilize high intensity mixing or pugging of a high solids kaolin/water mixture to reduce viscosity; however, the mixing and pugging are used in conjunction with other treatments. These patents use the synergistic effect of pugging coupled with other treatments to improve the rheological characteristics of kaolin slurries. For example, in U.S. Pat. No. 3,301,691 pugging coupled with heat treatment of the kaolin is discussed. U.S. Pat. No. 3,326,705 pugs in the presence of hydrochloric acid for viscosity reduction. Finally, U.S. Pat. Nos. 3,510,330 and 3,510,331 add urea and carboxylic acid, respectively, during the pugging stage.

The low shear viscosity of the crude kaolin clay and of the particle size fractions derived from that crude clay is one of the principal physical characteristics determining whether the clays and derived fractions will be utilized in the production of high value-added products for the paper industry. For example, see U.S. Pat. Nos. 4,105,466 and 4,030,941.

Therefore, a need exists in the industry for a method by which these crude viscous kaolin clay materials are rendered processable and ultimately useful as pigments and in paper coating applications.

SUMMARY OF THE INVENTION

Briefly described, the present invention provides a process for the manufacture of kaolin clay slurries from crude kaolin clay materials which are typically not processable by conventional methods owing to their inherently high viscosities. More specifically, this invention provides a process for the manufacture of these slurries which have reduced viscosities.

The process of this invention may be generally described as sequentially (1) mechanically working an undispersed (i.e., flocculated) crude kaolin clay material having a solids content of at least about 65 percent, by weight, under conditions which insure that the kaolin clay material will be subjected to an energy level of at least 10 horsepower-hours per ton of dry kaolin clay material; and (2) subjecting the mechanically worked kaolin clay material to centrifugation to substantially remove particles having a diameter of less than about 0.2 microns. The resulting slurry product has a reduced viscosity when compared to kaolin clay slurries manufactured by conventional processing techniques.

The sequence of steps in the above-described process is critical in order to obtain the improved slurry of this invention.

The process of this invention allows for optional steps. During formation of the slurry, for example, a dispersant or other processing aid can be mixed with the slurry to aid in formation or maintenance of the slurry.

The present invention provides a kaolin clay slurry which can be effectively used in subsequent processing steps well known in the industry for the manufacture of a commercially acceptable and viable kaolin clay product.

Accordingly, an object of this invention is to provide a crude kaolin clay slurry.

Another object of this invention is to provide a crude kaolin clay slurry having a reduced viscosity.

Another object of this invention is to provide a crude kaolin clay slurry which can be used in subsequent conventional processing steps.

Another object of this invention is to provide a crude kaolin clay slurry which can be used to manufacture a kaolin clay product useful as a filler and pigment and in various coatings.

A further object of this invention is to provide a process for the manufacture of a kaolin clay slurry.

A further object of this invention is to provide a process for the manufacture of a kaolin clay slurry having a reduced viscosity.

A further object of this invention is to provide a process for the manufacture of a kaolin clay slurry which can be used in subsequent conventional processing steps.

A still further object of this invention is to provide a process for the manufacture of a kaolin clay slurry which can be used to manufacture a kaolin clay product useful as a filler and pigment and in various coatings.

These and other objects, features and advantages of this invention will become apparent from the following detailed description.

DETAILED DESCRIPTION OF THIS INVENTION

In accordance with the present invention, the viscosity of a kaolin clay slurry is reduced by a process which comprises the sequential steps of:

A. mechanically working an undispersed crude kaolin clay material having a solids content of at least about 65 percent, by weight, under conditions which insure that the kaolin clay material will be subjected to an energy level of at least 10 horsepower-hours per ton of dry kaolin clay material; and B. subjecting the mechanically worked kaolin clay material to centrifugation to substantially remove any particles having a diameter of less than about 0.2 microns.

Typically, the crude kaolin clay is crushed and made down into a slurry form (blunged in water) at the mine site with the aid of one or more anionic dispersants. After this blunging step, the pH of the dispersed slurry is usually about 5–10, preferably 5.5–8. Oversized particles (i.e., grit, sand and other impurities) are then removed from the blunged clay by known means, such as the use of screens and gravity settling. In many processing operations, the degritted slip of kaolin is then separated into one or more particle size fractions by centrifugation or sedimentation. Well known methods are then used to increase the brightness of the fractionated or unfractionated kaolin clays. The brightness improvement methods employed on a clay process stream typically include magnetic separation, reductive leaching, flotation, selective flocculation and ozonation/oxidative bleaching. A delamination step may be carried out before leaching. Other than the step of reductive leaching, which is carried out at an acidic pH, the beneficiation steps are generally conducted with the kaolin slurry in a dispersed state, with the slurry pH neutral to basic. Removal of solubilized impurities along with by-product salts is effected by dewatering the leached clay, usually by filtration.

As noted earlier, the mechanical working step of this invention is carried out under conditions which insure that the undispersed kaolin clay material will be subjected to an energy level of at least 10 horsepower-hours per ton of dry kaolin clay material. These conditions will vary depending upon various factors, such as the equipment used, the horsepower rating of the equipment used and the retention time of the kaolin clay material within the equipment used. For example, the energy level could be at least 26, 38 or 60 horsepower-hours per ton of dry kaolin dry material.

The desliming or centrifugation step of the present invention can occur at any stage of processing following the blunging or mechanical working step but prior to the brightness and color improvement steps of conventional processing.

The mechanical working and centrifugation steps of this invention employ equipment and process conditions which are well known in this industry.

The present invention is further illustrated by the following examples which are illustrative of certain embodiments designed to teach those of ordinary skill in the art how to practice this invention and to represent the best mode contemplated for carrying out this invention.

Three batches (designated below as Examples 1–3) of high viscosity, coarse-grained crude kaolin clay materials from the Middle Georgia area are first processed as described below in Methods 1–5. Brookfield viscosities are then determined for the whole-fraction (i.e., unfractionated) 70% solids slurries at 100 rpm using TAPPI method T-648 om-88 as revised in 1988. This method sets forth specific procedures for determination of both low shear and high shear viscosity.

Due to the gel-like nature of smectite-containing clay/water slurries, their precise rheological characterization via Brookfield viscosity measurements can be difficult. In fact, reproducible measurements can only be obtained when a sufficiently large shear rate is applied to the slurry so that all individual particles in the slurry are forced to flow independently of each other. Once this is achieved, the effect of gelling on viscosity is negligible and rheological properties will be a function of other factors such as particle size, particle shape, particle size distribution (Funk and Dinger, 1994) and free water available for particle-particle lubrication. Therefore, those low-shear viscosities taken at higher shear rates (i.e., 100 rpm) are likely to give a more true indication of the presence of smectite and its effect on rheology. Furthermore, the improved accuracy of Brookfield viscosity measurements at higher shear rates also makes the 100 rpm a more desirable low shear measurement.

The following methods are used to process the high viscosity coarse-grained crude kaolin clay materials of Examples 1–3:

Method No. 1—Conventional Processing of Clay

A crude kaolin clay is deflocculated (dispersed) at a pH of 7.0 using sodium hexametaphosphate (2#/ton) and soda ash as dispersants and blunged at 35% solids for 5 minutes at 4,000 rpm using a Cowles dissolver. The 35% solids slurry is then screened and spray-dried.

Method No. 2—Flocculated Clay with Pugging/Kneading

A flocculated (undispersed) crude kaolin clay slurry having a 74% solids content is pugged (kneaded) in a Read sigma-blade mill. The total power input during pugging is shown in Examples 1–3. A 35% solids slurry of the pugged crude clay is then dispersed at a pH of 7.0 using sodium hexametaphosphate (2#/ton) and soda ash as dispersants and blunged at 35% solids for 5 minutes at 4,000 rpm using a Cowles dissolver. The 35% solids slurry is then screened and spray-dried.

Method No. 3—Deflocculated Clay with Pugging/Kneading

A deflocculated (dispersed) crude kaolin clay slurry having a 74% solids is pugged (kneaded) in a Read sigma-blade mill using 2#/ton sodium hexametaphosphate. The total power input during pugging is shown in Examples 1–3. A 35% solids slurry of the pugged crude clay is then dispersed at a pH of 7.0 by adding soda ash and blunging at 35% solids for 5 minutes at 4,000 rpm using a Cowles dissolver. The 35% solids slurry is then screened and sprayed-dried.

Method No. 4—Deflocculated Clay with Pugging/Kneading and Desliming

A deflocculated (dispersed) crude kaolin clay slurry having a 74% solids is pugged (kneaded) in a Read sigma-blade mill using 2#/ton sodium hexametaphophate. The total power input during pugging is shown in Examples 1–3. A 35% solids slurry of the pugged crude clay is then dispersed at a pH of 7.0 by adding soda ash and blunged at 35% solids for 5 minutes at 4,000 rpm using a Cowles dissolver. The 35% solids slurry is then screened. The screened 35% solids slurry is then diluted to 20% solids and deslimed with a high-speed centrifuge to remove particles having a diameter less than about 0.2 microns. The deslimed slurry is then dispersed to 35% solids and spray-dried.

Method No. 5—Flocculated Clay with Pugging/Kneading and Desliming-Invention

A flocculated (undispersed) crude kaolin clay slurry having a 74% solids is pugged (kneaded) in a Read sigma-blade mill. The total power input during pugging is shown in Examples 1–3. A 35% solids slurry of the pugged crude clay is then dispersed at a pH of 7.0 using sodium hexametaphosphate (2#/ton) and soda ash as dispersants and blunged at 35% solids for 5 minutes at 4,000 rpm using a Cowles dissolver. The 35% solids slurry is then screened. The screened 35% solids slurry is then diluted to 20% solids and deslimed with a high speed centrifuge to remove particles having a diameter less than about 0.2 microns. The deslimed slurry is then dispersed to 35% solids and spray-dried.

EXAMPLE 1

The procedure of Method No. 1 is not changed. With regard to Methods No. 2 and No.5, the total power input during pugging is 38 hp-hrs./ton. With regard to Methods No. 3 and No. 4, the total power input during pugging is 30 hp-hrs./ton. The results are shown in Table 1.

EXAMPLE 2

The procedure of Method No. 1 is not changed. With regard to Methods No. 2 and No. 5, the total power input during pugging is 26 hp-hrs./ton. With regard to Methods No. 3 and No. 4, the total power input during pugging is 52 hp-hrs./ton. The results are shown in Table 2.

EXAMPLE 3

The procedure of Method No. 1 is not changed. With regard to Methods No. 2–5, the total power input during pugging is 60 hp-hrs./ton. The results are shown in Table 3.

TABLE 1

(Example 1)

| Method | Minimum Brookfield Viscosity (cP @ 100 RPM) | Brookfield Accuracy ± cP | Minimum Hercules Viscosity (cP) | % Solids |
| --- | --- | --- | --- | --- |
| 1 | 557 | 10 | 246 | 70.0 |
| 2 | 190 | 4 | 66 | 69.9 |
| 3 | 248 | 4 | 108 | 70.0 |
| 4 | 191 | 4 | 344 | 70.0 |
| 5 | 158 | 4 | 174 | 69.8 |

TABLE 2

(Example 2)

| Method | Minimum Brookfield Viscosity (cP @ 100 RPM) | Brookfield Accuracy ± cP | Minimum Hercules Viscosity (cP) | % Solids |
| --- | --- | --- | --- | --- |
| 1 | 2392 | 40 | 330 | 69.8 |
| 2 | 237 | 4 | 70 | 70.1 |
| 3 | 338 | 4 | 97 | 69.8 |
| 4 | 178 | 4 | 134 | 69.9 |
| 5 | 136 | 4 | 92 | 70.1 |

TABLE 3

(Example 3)

| Method | Minimum Brookfield Viscosity (cP @ 100 RPM) | Brookfield Accuracy ± cP | Minimum Hercules Viscosity (cP) | % Solids |
| --- | --- | --- | --- | --- |
| 1 | 3500 | 100 | 435 | 69.9 |
| 2 | 364 | 4 | 145 | 70.1 |
| 3 | 548 | 10 | 180 | 70.1 |
| 4 | 240 | 4 | 192 | 69.9 |
| 5 | 219 | 4 | 171 | 70.1 |

This invention has been described in detail with particular reference to certain embodiments, but variations and modifications can be made without departing from the spirit and scope of the invention as defined in the following claims.

What is claimed is:

1. A process for reducing low shear viscosity of a kaolin clay material, wherein the process consists essentially of the sequential steps of:

A. mechanically working an undispersed crude kaolin clay material having a solids content of at least about 65 percent, by weight, said material being subjected to an energy level of at least 10 horsepower-hours per ton of dry kaolin clay material; and B. subjecting the mechanically worked kaolin clay material to centrifugation to substantially remove any particles having a diameter of less than about 0.2 microns;

wherein the kaolin clay material has a low shear viscosity less than the starting kaolin clay material.

2. A process as defined by claim 1 wherein the crude kaolin clay material is a coarse-grained crude kaolin clay material.

3. A process as defined by claim 1 wherein the crude kaolin clay material is a fine-grained crude kaolin clay material.

4. A process as defined by claim 1 wherein the solids content of the undispersed crude kaolin clay material is at least 71 percent by weight.

5. A process as defined by claim 1 wherein the undispersed crude kaolin clay material is mechanically worked at an energy level of at least 26 horsepower-hours per ton of dry kaolin clay material.

6. A process as defined by claim 1 wherein the undispersed kaolin clay material is mechanically worked at an energy level of at least 38 horsepower-hours per ton of dry kaolin clay material.

7. A process as defined by claim 1 wherein the undispersed kaolin clay material if mechanically worked at an energy level of at least 60 horsepower-hours per ton of dry kaolin clay material.

\* \* \* \* \*